United States Patent
Kamitani

(10) Patent No.: US 6,738,530 B1
(45) Date of Patent: May 18, 2004

(54) METHOD OF RECOGNIZING CHARACTER IN WHICH CORRECTION OF INCLINATION OF CHARACTER IS CARRIED OUT AND APPARATUS FOR CARRYING OUT THIS METHOD

(75) Inventor: Masaaki Kamitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/500,959

(22) Filed: Feb. 15, 2000

(30) Foreign Application Priority Data

Feb. 23, 1999 (JP) .......................... 045443/1999

(51) Int. Cl.⁷ .......................... G06K 09/36; G06K 09/32
(52) U.S. Cl. ........................ 382/289; 382/290; 382/291; 382/292; 382/293; 382/295
(58) Field of Search ................................. 382/289, 290, 382/291, 237, 292, 293, 295, 173, 176

(56) References Cited

U.S. PATENT DOCUMENTS

| | | | | |
|---|---|---|---|---|
| 4,452,374 A | * | 6/1984 | Hitchcock et al. | 220/62.12 |
| 4,933,865 A | * | 6/1990 | Yamamoto et al. | 382/203 |
| 5,278,918 A | * | 1/1994 | Bernzott et al. | 382/176 |
| 5,335,290 A | * | 8/1994 | Cullen et al. | 382/176 |
| 5,991,702 A | * | 11/1999 | Saito | 702/155 |
| 6,038,342 A | * | 3/2000 | Bernzott et al. | 382/173 |
| 6,055,336 A | * | 4/2000 | Niki | 382/237 |

FOREIGN PATENT DOCUMENTS

| | | |
|---|---|---|
| JP | 04-195485 | 7/1992 |
| JP | 04-276888 | 10/1992 |
| JP | 5-242297 | 9/1993 |
| JP | 10-307889 | 11/1998 |

OTHER PUBLICATIONS

N. Watanabe et al., "Base Line and Slant Correction for Handwritten Word Recognition", Technical Report PRU 94–100, (Jan. 1995), pp. 25–30 with Abstract.

* cited by examiner

Primary Examiner—Samir Ahmed
Assistant Examiner—Brian Le
(74) Attorney, Agent, or Firm—Sughrue Mion, PLLC

(57) ABSTRACT

A method of recognizing a character specifies a character in an image. Furthermore, the method of recognizing a character evaluates a symmetrical-ness of a shape of the character. Furthermore, the method of recognizing a character carries out an inclination correction process for the shape when the symmetricalness of the shape is detected.

27 Claims, 6 Drawing Sheets

METHOD OF RECOGNIZING CHARACTER IN WHICH CORRECTION OF INCLINATION OF CHARACTER IS CARRIED OUT AND APPARATUS FOR CARRYING OUT THIS METHOD

BACKGROUND OF THE INVENTION

1. Field of the Invention

The present invention relates to a method of recognizing a character in which a process of correcting an inclination of a character in accordance with a predetermined evaluation value which indirectly indicates the inclination of the character, and then specifying the character area and extracting the feature of the character. Furthermore, the present invention relates to a character recognizing apparatus for carrying out this method.

2. Description of the Related Art

Technical Report PRU 94–100 pp. 25–30 of The Institute of Electronics Information and Communication Engineers discloses "Correction of Standard Line And Correction of Inclination for Recognizing Handwritten English Word" for tracking a contour line and then estimating an inclination of a character from a frequency of its moving direction. If a stroke for a character is one, it is possible to theoretically determine a calculation equation for specifying a direction of a stroke, determination for a plurality of strokes.

However, in this method, an erroneous inclination direction is outputted if a rate of the oblique stroke of the character is not uniform. For example, in a case of a character string of "VAN", both of "V" and "A" are bilaterally symmetrical. Thus, it is possible to correctly determine the inclination direction of the character. On the other hand, since "N" has a stroke in the right downward direction. It is judged that a central line is inclined in the right downward direction overall.

Other than the above-mentioned method, a method is well known which determines the directional distribution of longitudinal strokes of a character and thereby estimates the inclination direction of the character from its most possible value and average value. However, this method has the same problem as the above-mentioned method in principle.

Furthermore, a method of recognizing a character is disclosed in Japanese Patent Laid-open JP-A H05-242297 and JP-A H10-307889.

SUMMARY OF THE INVENTION

An object of the present invention is to provide a method for omitting a process of a character inclination correcting process for a character to be recognized.

Another object of the present invention is to provide an apparatus which can be used for omitting a process of a character inclination correcting process for a character to be recognized.

Still another object of the present invention is to provide a medium with a program for a method of omitting a process of a character inclination correcting process for a character to be recognized.

In order to achieve an aspect of the present invention, a method of recognizing a character, includes specifying a character image of an image corresponding to a character, evaluating symmetry of the character image, carrying out an inclination correcting process for the character image to produce a corrected character image, when the symmetry of the character image is not detected and executing a character recognizing process to the corrected character image.

In the above, said charring out includes carrying out the inclination correcting process to correct an angle of the character image such that a symmetrical axis of the character image is oriented to a vertical axis.

In order to achieve another aspect of the invention, a method of recognizing a character, further includes generating a mirrored replica image of the character image; and comparing the character image and the mirrored replica image.

In the above, the evaluating is carried out based on the comparing result.

In the above, the comparing is carried out a raster scanning unit.

In order to achieve another aspect of the invention, a method of recognizing a character, further includes overlapping the character image and the mirrored replica image.

In the above, the evaluating of the symmetry of the character image includes counting image dots overlapping between the character image and the mirrored replica image.

In the above, the inclination correction process is carried out, when the count is larger than a predetermined threshold value.

In the above, the character image is a part of a character string image.

In order to achieve aspect of the invention, a character recognizing apparatus includes a character candidate specifying unit specifying a character image of an image corresponding to a character, a symmetry evaluating device evaluating symmetry of a the character image and an inclination correcting unit carrying out an inclination correcting process for the character image to produce a corrected character image, when the symmetry of the character image is not detected and a character recognizing unit executing a recognizing of the corrected character image.

In the above, the inclination correcting unit corrects an angle of the character image such that a symmetrical axis of the character image is oriented to a vertical axis.

In order to achieve another aspect of the invention, a character recognizing apparatus includes an image inverter generating a mirrored replica image of the character image and a threshold comparator comparing the character image and the mirrored replica image.

In the above, the symmetry evaluating device carries out the evaluating based on the comparing result.

In the above, the threshold comparator carries out the comparing for a raster scanning unit.

In the above, threshold comparator overlaps the character image and the mirrored replica image.

In the above, the symmetry evaluating device counts image dots overlapping between the character image and the mirrored replica image.

In the above, the inclination correcting unit carries out the inclination correction process, when the count is larger than a predetermined threshold value.

In the above, the character image is a part of a character string image.

In order to achieve another aspect of the invention, a character recognizing apparatus includes a character candidate specifying unit specifying a character string image of an image corresponding to a character in an image, a symmetry evaluating device evaluating symmetry of character images of the character string image, an inclination correcting unit carrying out an inclination correcting process for the character string images to produce a corrected character image, when the symmetry in each of character images are not detected and a character recognizing unit executing a recognizing of the corrected character image.

In the above, the inclination correcting unit corrects an angle of the character string image such that symmetrical axis of the character images are oriented to a vertical axis, to produce a corrected character string image.

In order to achieve still another aspect of the invention, a character recognizing apparatus includes an image inverter generating a mirrored replica string image of the character images of the character string image and a threshold comparator comparing the character string image and the mirrored replica string image.

In the above, the symmetry evaluating device carries out the evaluation based on the comparing result.

In the above, the threshold comparator carries out the comparing for a raster scanning unit.

In the above, the threshold comparator overlaps the character string image and the mirrored replica string image.

In the above, the symmetry evaluating device counts image dots overlapping between the character string image and the mirrored replica string image.

In the above, the inclination correcting unit carries out the inclination correction process, when the count is larger than a predetermined threshold value.

In order to achieve aspect of the invention, a medium with a program for a method of recognizing a character includes a module specifying a character image of image corresponding to a character, a module evaluating symmetry of a the character image, a module carrying out an inclination correcting process for the character image to produce a corrected character image, when the symmetry of the character image is not detected and a module executing a character recognizing process to the corrected character image.

In the above, the module of the inclination correcting process corrects an angle of the character image such that a symmetrical axis of the character image is oriented to a vertical axis.

In order to achieve another aspect of the invention, a medium with a program for a method of recognizing a character further includes a module generating a mirrored replica image of the character image and a program comparing the character image and the mirrored replica image.

In the above, the module of the evaluating is carried out based on the comparing result.

In the above, the module of the comparing is carried out a raster scanning unit.

In the above, the module of the comparing includes a program overlapping the character image and the mirrored replica image.

In the above, the module of the evaluating the symmetry of the character image includes counting image dots overlapping between the character image and the mirrored replica image.

In the above, the module of the inclination correction process is carried out, when the count is larger than a predetermined threshold value.

In the above, the character image is a part of a character string image.

The present invention can refer to firstly several characters to thereby omit the inclination correcting process for the character string for which the inclination correction is obviously unnecessary. Especially, if character strings having inclinations partially exist in a large amount of character strings, the present invention can reduce the entire throughput, as compared with the case that the correction process is performed on all the character strings.

DESCRIPTION OF THE PREFERRED EMBODIMENTS

Figure 1:
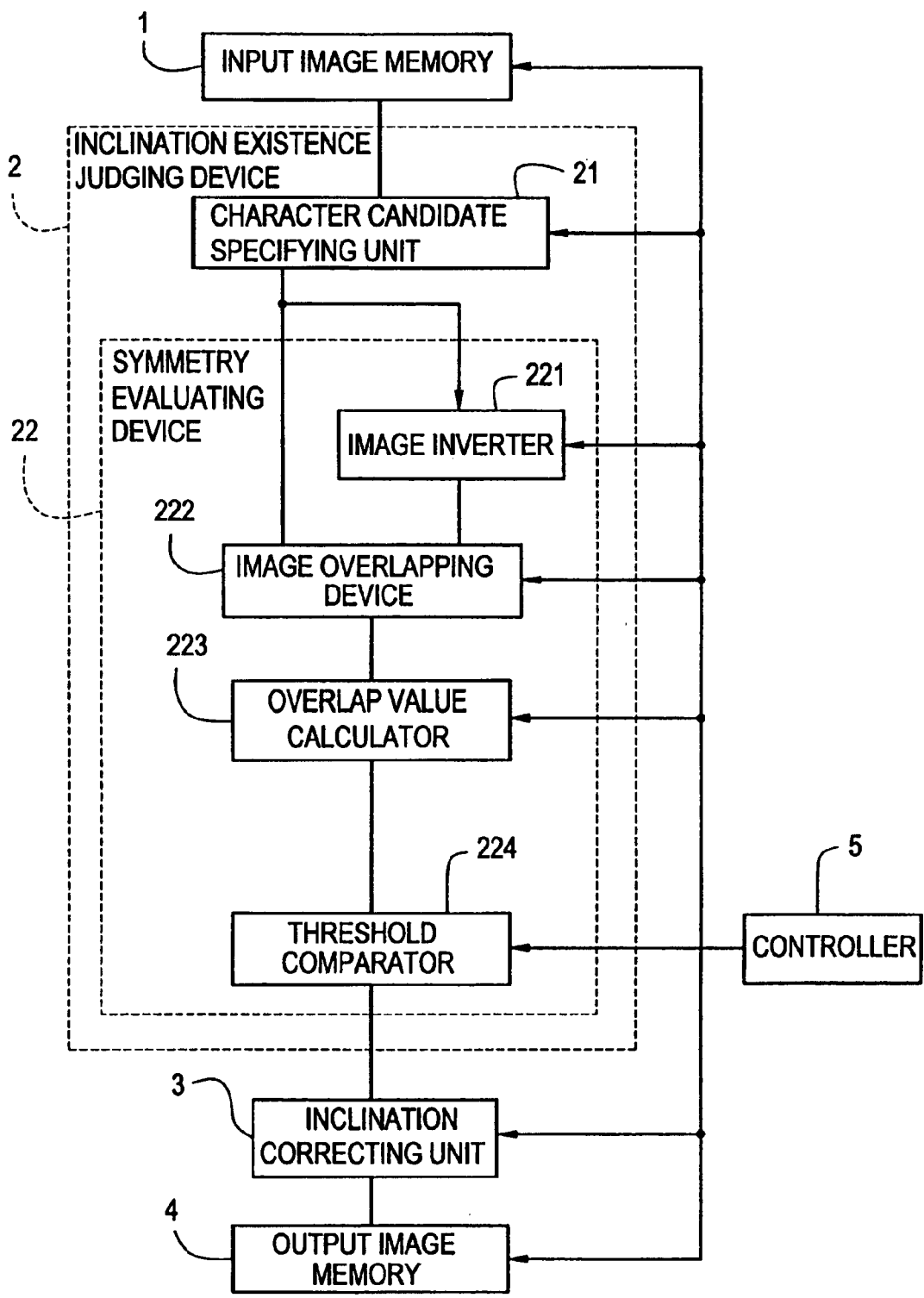
FIG. 1 is a block diagram showing an embodiment of the present invention.

FIG. 1 is a block diagram showing a first embodiment of the present invention. In FIG. 1, 1 denotes an input image memory. 2 denotes an inclination existence judging device mounted according to the present invention. 3 denote an inclination correcting unit. 4 denotes an output image memory. And, 5 denotes a controller. The input image memory 1 reads an image from a printed matter such as a magazine, a letter or a postal matter by using an optical unit or other units, and then stores therein a character string specified from the read result. The reading operation of the input image memory 1 may be performed on an image stored in a storing medium by using a magnetic manner or other manners. The inclination existence judging device 2 is provided with a character candidate specifying unit 21 and a symmetry evaluating device 22. The symmetry evaluating device 22 is provided with an image inverter 221, an image overlapping device 222, an overlap value calculator 223 and a threshold comparator 224.

The character candidate specifying unit 21 refers to a character string image stored in the input image memory 1, and then specifies a partial image corresponding to one character. The method of specifying the partial image may use a well known method typically used in character recognition technical field.

According to this method, by referring the character string image and using a portion where a projective value is 0, a portion of a valley bottom where the projection is concave, a top of a portion where the projection is convex, and a large variation portion between old character string image and new character string image as a boundary of the character, the partial image corresponding to one character can be specified. Still another specifying method employs a device for determining the linkage components of pixels by a labeling process, and then generating the partial image from a simplex of individual linkage components or its combination.

The image inverter 221 refers to the partial image specified by the character candidate specifying unit 21, and generates an image in which the right and left sides are inverted. This generating process may be carried out in software by using a microprocessor system comprising random access memories. As another embodiment, it may be carried out in hardware by using an operating unit, in which respective bits of a register are wired-connected. The image overlapping device 222 refers to the partial image outputted by the character candidate specifying unit 21 and the inverted image outputted by the image inverter 221, and then outputs its result as the overlap image. The overlapping process may be carried out in software by using a logical AND operation command in a general microprocessor. Its process may be carried out in hardware having a dedicated logical AND operator for each bit.

The overlap value calculator 223 refers to the overlap image outputted by the image overlapping device 222, and then counts the number of overlap pixels, and further outputs a value compared with an area of the partial image. The number of pixels can be counted by a system of a general microprocessor which carries out a program to count effective bits by referring to the values of the respective bits. Another embodiment can be attained by using a dedicated hardware comprising a calculator for counting the number for each bit value by referring to respective bits of a memory for storing therein the overlap result of the partial image. The threshold comparator 224 refers to the compared value outputted by the overlap value calculator 223, and accordingly judges the presence or absence of the inclination, in accordance with a comparison condition with a predetermined threshold value. A device for carrying out the comparing process may be attained in software by using a comparison operation command of the general microprocessor. Also, it may be attained as hardware comprising an operator for carrying out a magnitude comparison operation.

The inclination correcting unit 3 judges the necessity of the inclination correction in accordance with the result outputted by the threshold comparator 224, and then carries out the inclination correcting process. An inclination correction algorithm used here can employ the conventionally used known method. The output image memory 4 stores an image after the inclination correcting process. The controller 5 is the control center for carrying out the operation control in accordance with a start sequence management and a condition judgment result of the above-mentioned respective processes.

Figure 2:
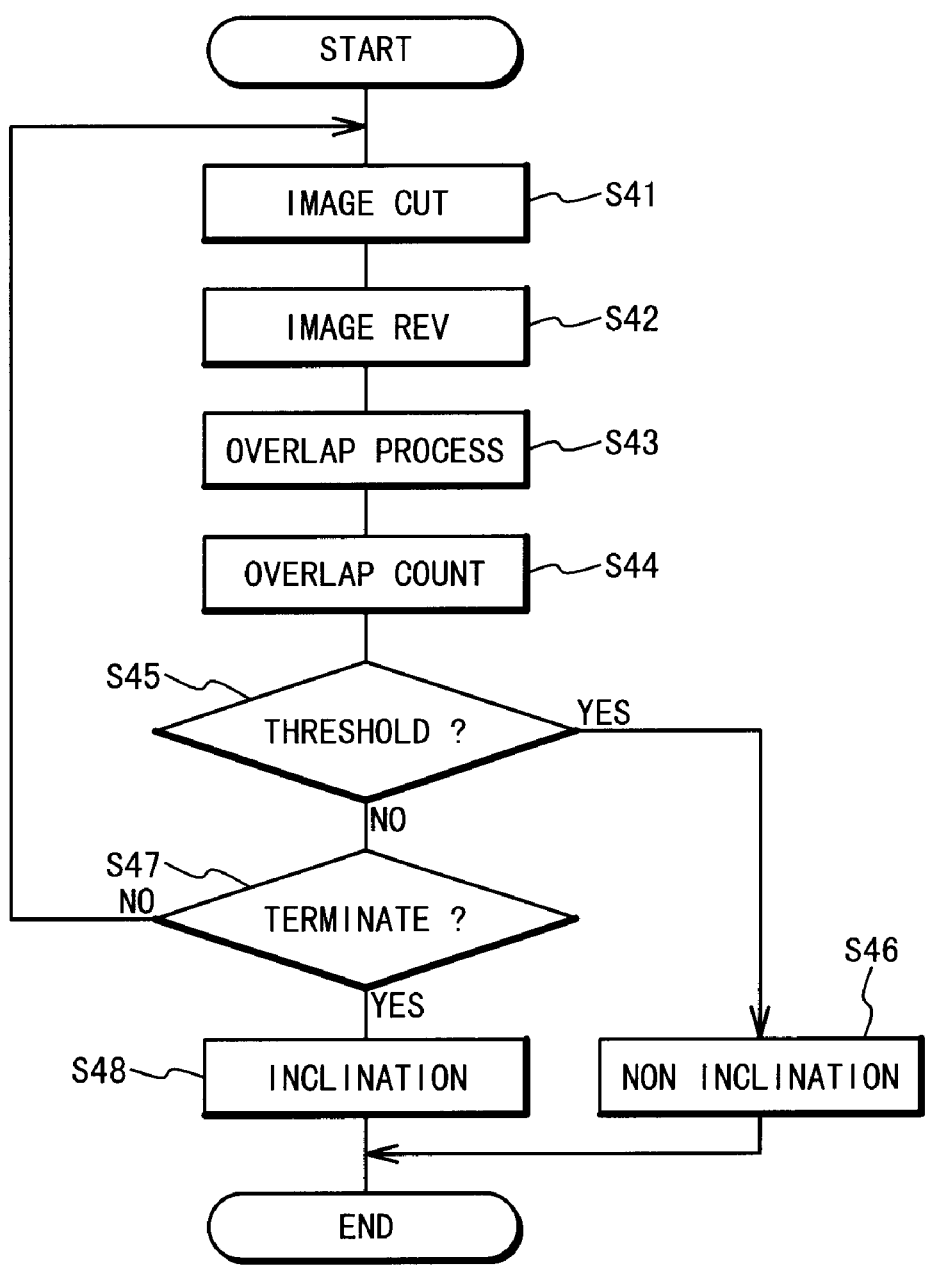
FIG. 2 is a flowchart showing another embodiment of the present invention.

FIG. 2 shows the operation procedure of the embodiment shown in FIG. 1 by using a flowchart. The operation of the embodiment in the present invention shown in FIG. 1 will be described below with reference to the flowchart shown in FIG. 2. The character string image stored in the input image memory 1 is cut and separated by the character candidate specifying unit 21, and converted into a character candidate image. The character candidate specifying unit 21 sequentially generates a character candidate image (cut image) in a form that can be considered as a character candidate (Step S41), and then prepares for the processes after that. The character candidate image is inputted to the image inverter 221, and then a mirrored image in which the right and left sides are inverted is generated (Step S42). The mirrored image is overlapped with the original character candidate image by the image overlapping device 222 (Step S43). Then, a marking process is carried out so as to extract the overlap portion at a unit of a pixel. In this marking process, background pixels are represented by "0", and character pixels are represented by "1". Therefore, the marking process can be attained by using the logical AND operation for each pixel. This operator can be attained by using a programmable microprocessor and the like.

The overlap value calculator 223 divides an area of the overlap portion by an area of the character candidate image, and then uses this value as a scale to judge the presence or absence of the inclination. The area of the overlap portion can be determined by counting the number of marked pixels (Step S44). The area of the character candidate image can be similarly determined by counting the number of pixels. Furthermore, these areas can be determined by multiplying the number of pixels in the longitudinal direction by the number of pixels in the lateral direction. The threshold comparator 224 compares this evaluation value with a predetermined threshold value (Step S45). If the evaluation value is greater than the threshold value, the threshold comparator 224 judges that there is no inclination in the character string (Step S46). After that, the judging process performed on the character candidate image is stopped, and the entire processes are ended without carrying out the inclination correcting process. If it is not judged that there is an inclination in a character string since the evaluation value is smaller than the threshold value, the similar overlap judging process is performed on a next character candidate image (Step S47). If it is not judged that there is an inclination for any of character candidate images, it is judged that there is a possibility of an inclination in this character string (Step S48). Then, the inclination correction process similar to the conventional technique is carried out by the inclination correcting unit 3.

Figure 3:
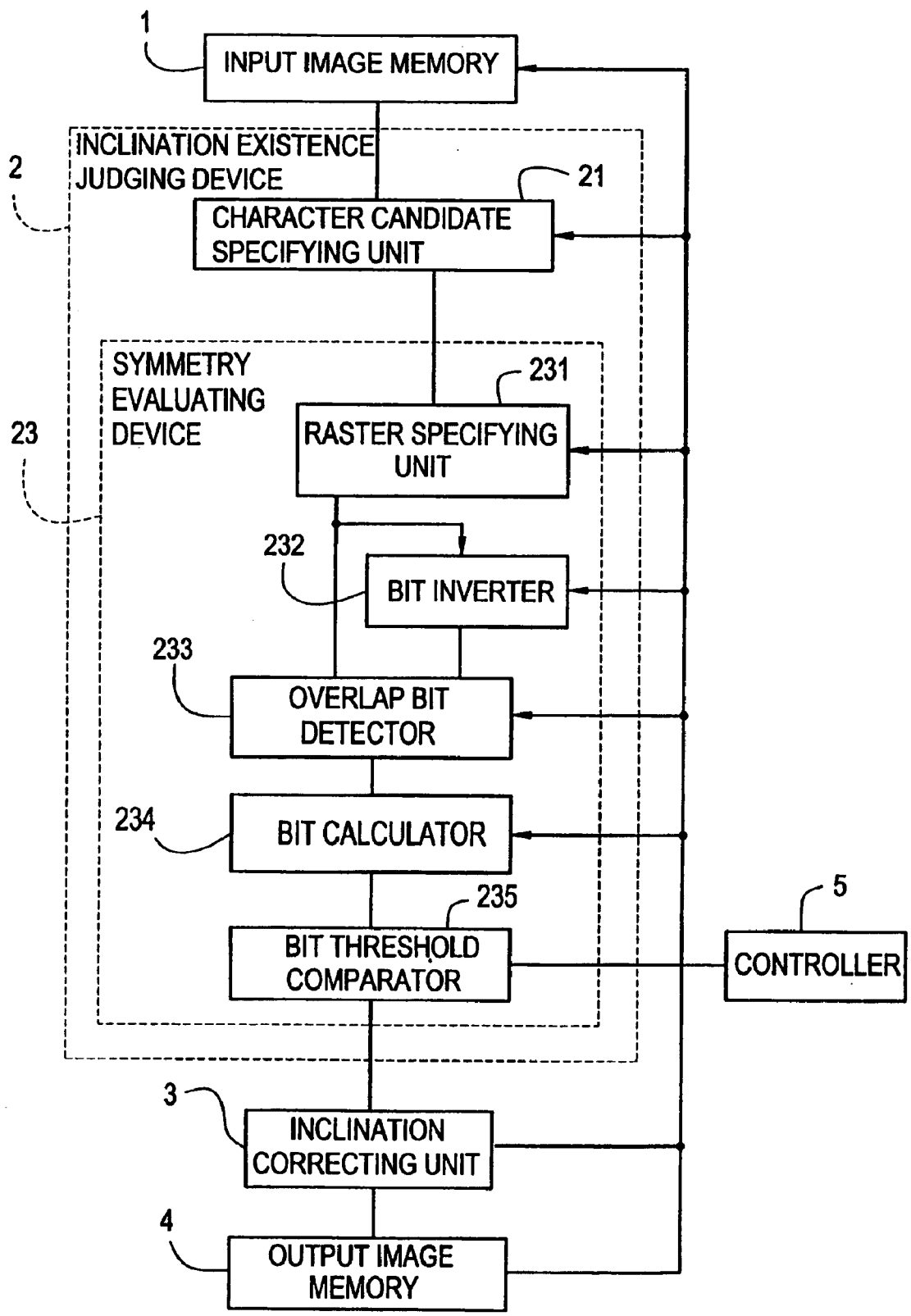
FIG. 3 is a block diagram showing still another embodiment of the present invention.

FIG. 3 is a block diagram showing another embodiment of the present invention. Here, the difference from the embodiment shown in FIG. 1 is emphatically described. In the embodiment shown in FIG. 3, the difference from the embodiment shown in FIG. 1 lies in the configuration of a symmetry evaluating device (22 shown in FIG. 1). A symmetry evaluating device 23 is provided with a raster specifying unit 231, a bit inverter 232, an overlap bit detector 233, a bit calculator 234 and a bit threshold comparator 235.

The raster specifying unit 231 refers to the partial image outputted by the character candidate specifying unit 21, and then cuts out and outputs a bit string for each line. The bit inverter 232 refers to the bit string specified by the raster specifying unit 231, inverts a list of the bits, and then outputs a second bit string. The overlap bit detector 233 refers to the bit string outputted by the raster specifying unit 231 and the second bit string outputted by the bit inverter 232, and then extracts the overlap bits through the logical AND operation, and further generates a third bit string. The bit calculator 234 refers to the third bit string obtained for the bit string specified for each raster, and then counts and outputs the number of overlap bits. The bit threshold comparator 235 refers to the number of bits outputted by the bit calculator 234, and then judges the presence or absence of the inclination in accordance with the comparison condition with the predetermined threshold value.

Figure 4:
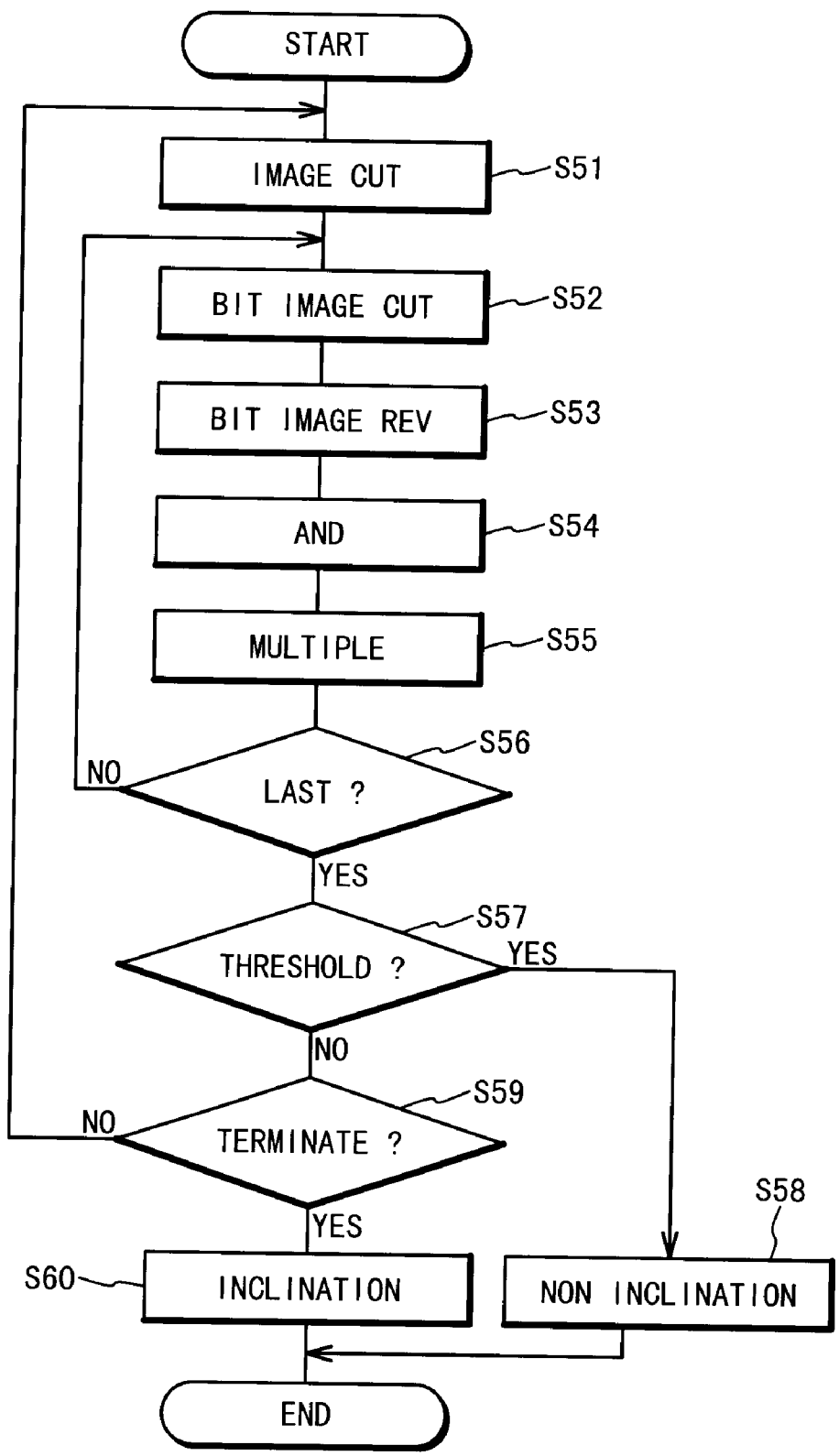
FIG. 4 is a view showing an operation of the embodiment shown in FIG. 1 by using a flowchart.
Figure 5:
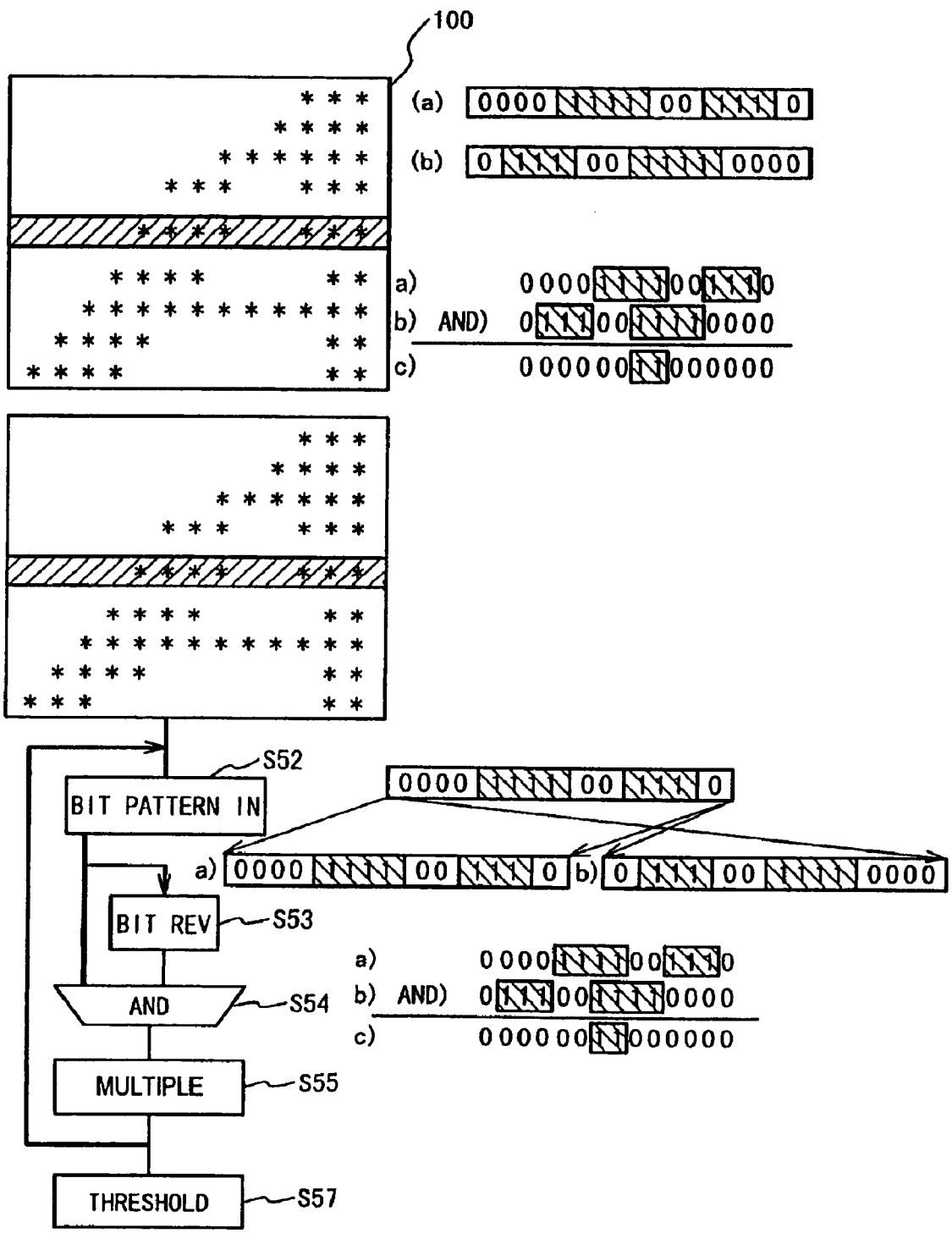
FIG. 5 is a view showing an operation of the embodiment shown in FIG. 2 by using a flowchart.

FIGS. 4 and 5 are views quoted to describe the operations of the embodiment shown in FIG. 3. FIGS. 4 and 5 are the flowchart showing the operation procedure and the view conceptually showing the operation principal. In FIG. 5, 100 denotes a cut partial image, and a portion shown with hatching in the cut partial image indicates a pixel corresponding to one raster. The block to which the same symbol as FIG. 2 is given indicates the same process block as FIG. 2.

The embodiment shown in FIG. 3 will be described below with reference to FIGS. 4 and 5. At first, the partial image is specified (Step S51). The cut partial image is divided into bit strings for each raster by the raster specifying unit 231 (Step S52). A second bit string in which the list of bits is inverted (Step S53) is generated for each bit string by the bit inverter 232. The generated two bit strings are inputted to the overlap bit detector 233. An element detecting the overlap bit portion is outputted as a third bit string (Step S54). The bit calculator 234 adds the number of overlap bit portions indicated in the third bit string, and then accumulates the portions (Step S55). This overlap bit counting process at a unit of a bit string is repeated until the number of overlap bit portions is added to all the raster (Step S56). The obtained number of overlap bits is divided by the number of total pixels in the character candidate, and then used as the evaluation value indicative of the presence or absence of the inclination. The threshold comparator 235 compares this evaluation value with the predetermined threshold value (Step S57). If the evaluation value is greater than the threshold value, the threshold comparator 235 judges that there is no inclination in the character string (Step S58), and then stops the judging process performed on the character candidate images after that. Then, the entire processes are ended without carrying out the inclination correcting process. If it is not judged that there is an inclination in the character string since the evaluation value is smaller than the threshold value, the similar overlap judging process is also performed on a next character candidate image (Step S59). If it is not judged that there is an inclination for any of character candidate images, it is judged that there is a possibility of an inclination in this character string (Step S60). Then, the inclination correcting process similar to the conventional technique is carried out by the inclination correcting unit 3. In addition, in an example shown in FIG. 5, a multiple value is exemplified as "2". Then, when multiple values are determined with regard to all lines, they are compared with a total number of black pixels, and then its rate is used as the evaluation value.

Figure 6:
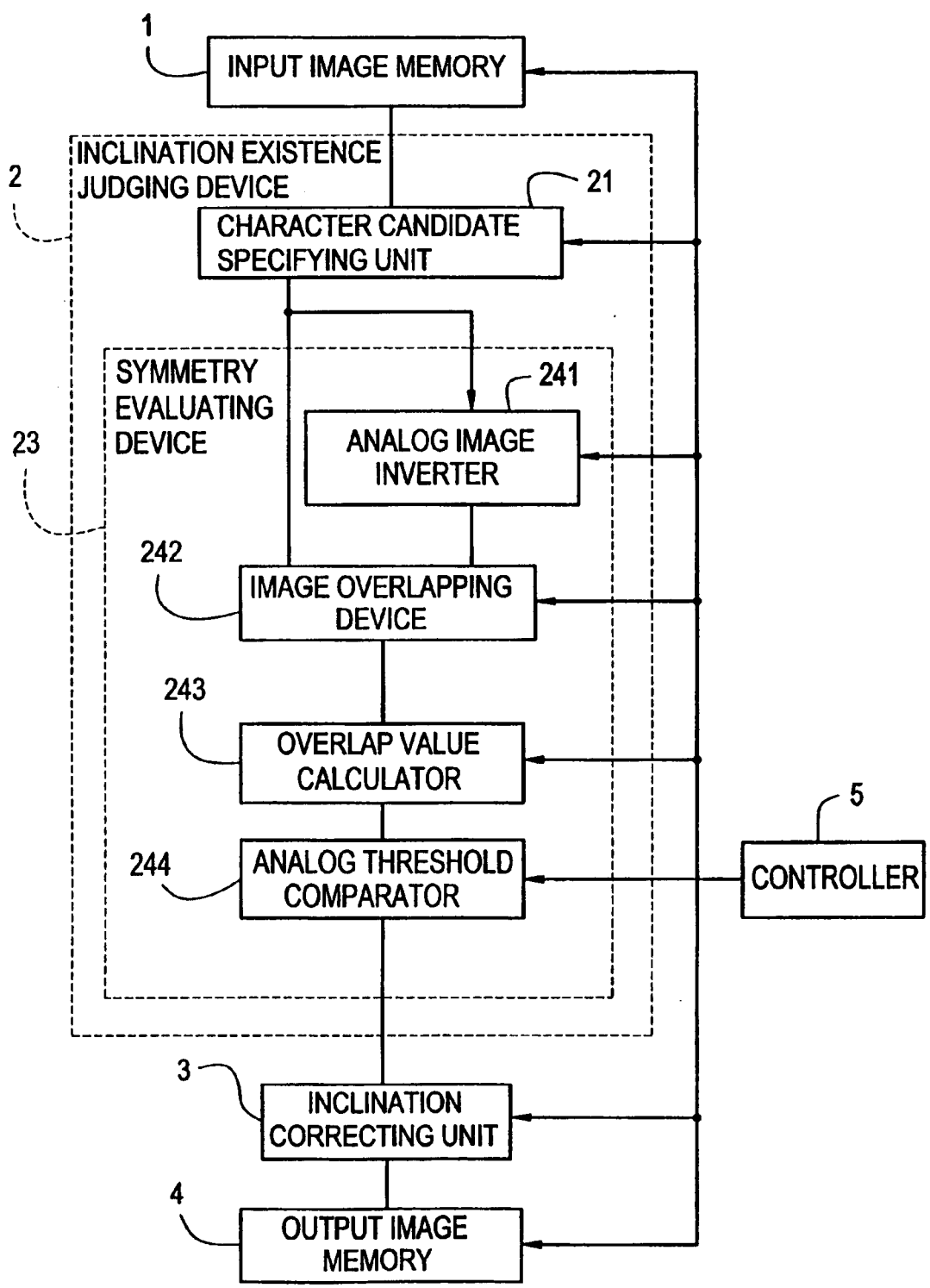
FIG. 6 is a view conceptually showing an operation principal of the embodiment shown in FIG. 2.

Incidentally, the above-mentioned embodiments have been all described by using a digital operation. However, it can be described by using an analog operation. FIG. 6 shows an embodiment for the analog operation. In the embodiment shown in FIG. 6, a symmetry evaluating device 24 is provided with an analog image inverter 241, an analog image overlapping device 242, an analog overlap value calculator 243 and an analog threshold comparator 244. The analog image inverter 241 can be attained by the wired-connection between pixels corresponding to inversion positions. The analog image overlapping device 242 can be attained by referring to the partial image outputted by the character candidate specifying unit 21 and the mirrored image outputted by the image inverter 241, and then determining a calculation value of a pixel by using the analog operation. The analog overlap calculator 243 can be attained by referring to the overlap image obtained from the image overlapping device 242, and then calculating the values of the respective pixels represented by analog values, by using an analog addition operator such as an operation amplifier and the like. The section for carrying out a comparison operation in the analog threshold comparator 244 is attained by using comparator elements represented by operation amplifiers and the like, and further using an analog operation. This is operationally similar to the embodiment shown in FIG. 1 except that the digital operation is replaced by the analog operation in the above configuration. The detailed portions are not described in order to avoid the duplication.

A module of the above method which can be used by the above apparatus can be stored in a medium.

As mentioned above, the present invention can refer to the firstly several characters to thereby omit the inclination correcting process for the character string for which the inclination correction is obviously unnecessary. Especially, in the case of the character string having the partial inclinations in a large amount of character strings, the present invention can reduce the entire throughput, as compared with the case that the correction process is performed on all the character strings.

What is claimed is:

1. A method of recognizing a character comprising:
    specifying a character image of an image corresponding to a character;
    evaluating symmetry of the character image;
    determining if a symmetry of the character image is detected;
    carrying out inclination correcting process for the character image to produce a corrected character image, when the symmetry of the character image is not detected;
    executing a character recognizing process to the corrected character image;
    generating a mirrored replica image of the character image; and
    comparing the character image and the mirrored replica image,
    wherein said carrying out comprises carrying out the inclination correcting process to correct an angle of the character image such that a symmetrical axis of the character image is oriented to a vertical axis.

2. A method of recognizing a character as claimed in claim 1, wherein the evaluating is carried out based on the comparing result.

3. A method of recognizing a character as claimed in claim 2, wherein the comparing is carried out for a raster scanning unit.

4. A method of recognizing a character as claimed in claim 3, wherein the comparing comprises overlapping the character image and the mirrored replica image.

5. A method of recognizing a character as claimed in claim 4, wherein the evaluating symmetry of the character image comprises counting image dots overlapping between the character image and the mirrored replica image.

6. A method of recognizing a character as claimed in claim 5, wherein the inclination correction process is carried out, when the count is larger than a predetermined threshold value.

7. A method of recognizing a character as claimed in claim 6, wherein the character image is a part of a character string image.

8. A character recognizing apparatus comprising:
    a character candidate specifying unit specifying a character image of an image corresponding to a character;
    a symmetry evaluating device evaluating symmetry of the character image; and determining if the symmetry of the character image is detected;
    an inclination correcting unit carrying out an inclination correcting process for the character image to produce a corrected character image, when the symmetry of the character image is not detected;
    a character recognizing unit executing a recognizing of the corrected character image;
    an image inverter generating a mirrored replica image of the character image; and
    a threshold comparator comparing the character image and the mirrored replica image,
    wherein the inclination correcting unit corrects an angle of the character image such that a symmetrical axis of the character image is oriented to a vertical axis.

9. A character recognizing apparatus as claimed in claim 8, wherein the symmetry evaluating device carries out the evaluating based on the comparing result.

10. A character recognizing apparatus as claimed in claim 9, wherein the threshold comparator carries out the comparing for a raster scanning unit.

11. A character recognizing apparatus as claimed in claim 10, wherein the threshold comparator overlaps the character image and the mirrored replica image.

12. A character recognizing apparatus as claimed in claim 11, wherein the symmetry evaluating device counts image dots overlapping between the character image and the mirrored replica image.

13. A character recognizing apparatus as claimed in claim 12, wherein the inclination correcting unit carries out the inclination correction process, when the count is larger than a predetermined threshold value.

14. A character recognizing apparatus as claimed in claim 13, wherein the character image is a part of a character string image.

15. A character recognizing apparatus comprising:
 a character candidate specifying unit specifying a character string image of an image corresponding to a character;
 a symmetry evaluating device evaluating symmetry of character images of the character string image, and determining if a symmetry of at least one of the character images is detected;
 an inclination correcting unit carrying out an inclination correcting process for the character string images to produce a corrected character image, when the symmetry in each of the character images is not detected;
 a character recognizing unit executing a recognizing of the corrected character image;
 an image inverter generating a mirrored replica string image of the character images of the character string image; and
 a threshold comparator comparing the character string image and the mirrored replica string image,
 wherein the inclination correcting unit corrects an angle of the character string image such that symmetrical axis of the character images are oriented to a vertical axis, to produce a corrected character string image.

16. A character recognizing apparatus as claimed in claim 15, wherein the symmetry evaluating device carries out the evaluating based on the comparing result.

17. A character recognizing apparatus as claimed in claim 16, wherein the threshold comparator carries out the comparing for a raster scanning unit.

18. A character recognizing apparatus as claimed in claim 17, wherein the threshold comparator overlaps the character string image and the mirrored replica string image.

19. A character recognizing apparatus as claimed in claim 18, wherein the symmetry evaluating device counts image dots overlapping between the character string image and the mirrored replica string image.

20. A character recognizing apparatus as claimed in claim 19, wherein the inclination correcting unit carries out the inclination correction process, when the count is larger than a predetermined threshold value.

21. A medium with a program for a method of recognizing a character comprising:
 a module specifying a character image an image corresponding to a character;
 a module evaluating symmetry of the character image, and determining if a symmetry of the character image is detected;
 a module carrying out inclination correcting process for the character image to produce a corrected character image, when the symmetry of the character image is not detected;
 a module executing a character recognizing process to the corrected character image;
 a module generating a mirrored replica image of the character image; and
 a module comparing the character image and the mirrored replica image,
 wherein said carrying out module comprises carrying out the inclination correcting process to correct an angle of the character image such that a symmetrical axis of the character image is oriented to a vertical axis.

22. A medium with a program for a method of recognizing a character as claimed in claim 21, wherein the evaluating module is carried out based on the comparing result.

23. A medium with a program for a module of a method of recognizing a character as claimed in claim 22, wherein the comparing module is carried out for a raster scanning unit.

24. A medium with a program for a module of a method of recognizing a character as claimed in claim 23, wherein the comparing module comprises overlapping the character image and the mirrored replica image.

25. A medium with a program for a module of a method of recognizing a character as claimed in claim 24, wherein the evaluating module comprises counting image dots overlapping between the character image and the mirrored replica image.

26. A medium with a program for a module of a method of recognizing a character as claimed in claim 25, wherein the module of the inclination correction process is carried out, when the count is larger than a predetermined threshold value.

27. A medium with a program for a module of a method of recognizing a character as claimed in claim 26, wherein the character image is a part of a character string image.

* * * * *